F. W. EAMES.
Couplings for Vacuum-Brakes.
No. 198,584. Patented Dec. 25, 1877.
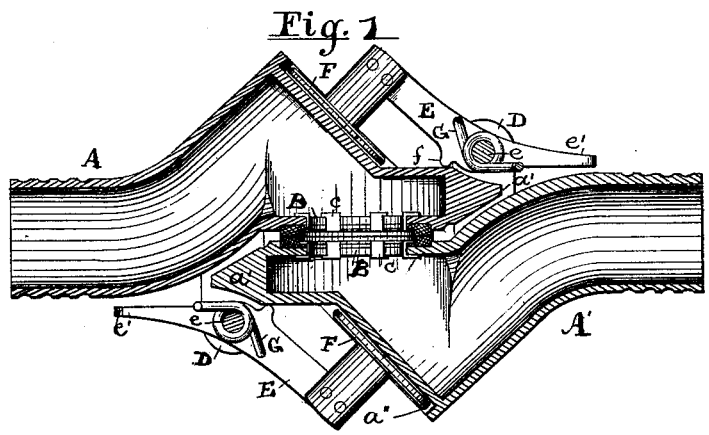
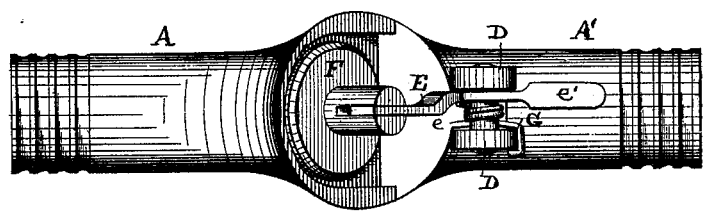
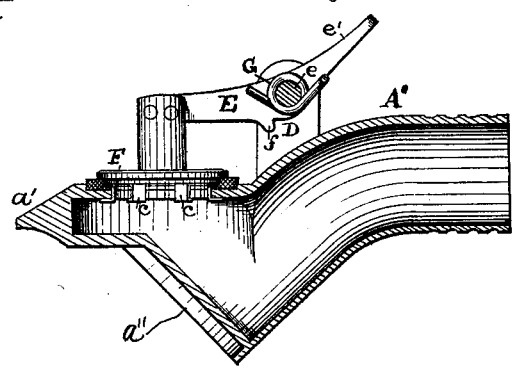
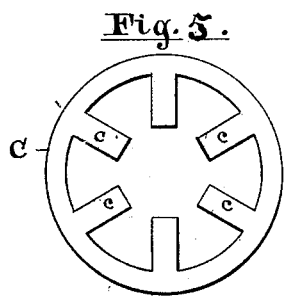
Witnesses:
D. G. Stuart
Wm. H. Babcock
Inventor:
Frederick W. Eames
by A. McCallum
Atty

UNITED STATES PATENT OFFICE.

FREDERICK W. EAMES, OF WATERTOWN, NEW YORK.

IMPROVEMENT IN COUPLINGS FOR VACUUM-BRAKES.

Specification forming part of Letters Patent No. 198,584, dated December 25, 1877; application filed June 12, 1877.

*To all whom it may concern:*

Be it known that I, FREDERICK W. EAMES, of Watertown, in the county of Jefferson and State of New York, have invented certain new and useful Improvements in Couplings for Vacuum-Brakes; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to couplings for car-brakes which are operated by means of what is known as "vacuum-power," or the natural pressure of the atmosphere as opposed to a vacuum.

The coupling consists of two parts or halves, each the counterpart of the other, one part being secured to the flexible portion of the air pipe or tube at one end of the car, and the other to the tube at the opposite end, the arrangement of the parts being such that when brought together the one will be the right half, and the other the left half, so that the coupling will be always effected without requiring to twist the flexible tube around so as to bring the two halves of the coupling into proper position.

The invention consists in certain new and improved devices and combinations of devices embodied in the construction of the coupling, whereby the parts may be readily brought together to form a close air-tight joint, and be as readily separated, either by hand or accidentally, without injury to the parts, all as hereinafter more fully set forth.

In the accompanying drawings, Figure 1 is a longitudinal sectional view of my improved coupling device. Fig. 2 is an elevation of same. Fig. 3 is a detached view of one half of the coupling, showing it partly in section. Fig. 4 is a sectional view, showing the rubber gasket and manner of fastening the same; and Fig. 5 is a detached view of the brass ring or device by means of which the gasket is secured to the coupling.

Referring to the parts by letters, A A′ represent a pair or two halves of the coupling device, each half being the counterpart of the other, and secured to the flexible tubes which form the connection between the cars, so that when brought together the one will be a right half and the other a left half of the coupling. Each part has a lateral opening in its end, in which a rubber gasket, B, is seated, an annular groove, $a$, being formed in the face or rim of the opening for its reception. The gasket also has an annular depression or flange, $b$.

C is a ring struck out from brass or other suitable metal, having internally-projecting strips or wings $c$. This ring is placed or forced into the annular flange $b$ of the gasket, and the wings or strips $c$ are bent down and under the inner periphery of the lateral opening in the end of the coupling, thereby securing the gasket in position, so that it cannot drop out and become lost.

D D are lugs or projections on the outside of the coupling, between which a lever, E, is pivoted by means of a pin or bolt, $e$. One end of this lever E is formed into a thumb-piece, $e'$, and the other is provided with a disk or valve, F.

G is a spring coiled around the pin $e$, one end being secured to the lever E, and the other to one of the lugs D. $a'$ is a nose or projecting point formed on the end of each half of the coupling, serving as a guide and additional fastening when the parts are brought together. The face of this projection is curved or beveled off, as clearly shown in the drawings.

$f$ is a rounded projection or teat formed on the inner side of the lever E, which comes in contact with the projection $a'$ of the counterpart of the coupling, and serves to hold the parts in place when brought together.

In connecting the two halves of the coupling the lateral opening of the one is brought directly opposite the corresponding opening of the other, the projections or noses $a'$ guiding the parts to their proper position, at the same time the valves being kept open by pressure on the ends of the levers E. The faces of the two rubber gaskets will now be in close contact, forming a close air-tight joint between them. The guide projections $a'$ will have been passed in between the lugs D D, and when the pressure is removed from the levers E the projections or teats $f$ are pressed down upon them, and the valve-disks F are pressed down on the flat faces $a''$ on the ends of the couplings through the action of springs G, as clearly shown by Figs. 1 and 2 of the drawings. In this way the parts are securely held together when the coupling is effected, and a free, unobstructed channel is left for the passage of the air through them. Should, however, the cars separate accidentally, the two parts of the coupling will draw apart without injury, the valves instantly closing through the action of the springs, so as to prevent the passage of air into or from the tubes. When it is desired to separate the parts of the coupling by hand, all that is necessary is to press upon the levers and pull them apart.

It will be obvious to those skilled in the art that a coupling of this construction is peculiarly fitted for use in connection with vacuum-brake apparatus. The valves, being located entirely on the outside of the coupling, do not obstruct the passage of the air through the pipes, and when the parts of the coupling are separated the broad surface of the disk-valve is acted upon with great force by the natural pressure of the atmosphere as opposed to the vacuum formed in the pipe, thereby forming a perfectly air-tight joint.

Having thus described my invention, what I claim as new, and desire to secure by Letters Patent, is—

1. In a counterpart coupling constructed, substantially as described, with lateral end openings, the gaskets B, seated in said openings, and secured in position by means of the ring C, having rings $c$, substantially as and for the purpose specified.

2. The combination of the parts A A', each having the beveled projecting nose $a'$ and the flat bearing-surface $a''$, with the levers E, having disks F and teats $f$, and with springs G, substantially as and for the purpose specified.

3. In combination with a coupling having lateral end opening, as described, the gasket B, valve F, lever E, and spring G, substantially as and for the purpose specified.

In testimony that I claim the foregoing as my own I affix my signature in presence of two witnesses.

FREDERICK W. EAMES.

Witnesses:
   D. G. STUART,
   EDWIN M. FRAZEE.